(12) United States Patent
Kim et al.

(10) Patent No.: US 9,179,124 B2
(45) Date of Patent: Nov. 3, 2015

(54) METHOD AND APPARATUS FOR GENERATING STEREOSCOPIC IMAGE DATA STREAM BY USING CAMERA PARAMETER, AND METHOD AND APPARATUS FOR RESTORING STEREOSCOPIC IMAGE BY USING CAMERA PARAMETER

(75) Inventors: Yong-tae Kim, Seoul (KR); Gun-ill Lee, Seoul (KR); Dae-sik Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 827 days.

(21) Appl. No.: 12/392,613

(22) Filed: Feb. 25, 2009

(65) Prior Publication Data

US 2009/0295907 A1 Dec. 3, 2009

Related U.S. Application Data

(60) Provisional application No. 61/056,174, filed on May 27, 2008.

(30) Foreign Application Priority Data

Jul. 23, 2008 (KR) ........................ 10-2008-0071897

(51) Int. Cl.
*H04N 13/00* (2006.01)
*G06F 3/12* (2006.01)
(Continued)

(52) U.S. Cl.
CPC ......... *H04N 13/0055* (2013.01); *H04N 19/597* (2014.11)

(58) Field of Classification Search
CPC .......... H04N 13/0007; H04N 13/0055; H04N 13/0278; H04N 13/0011; H04N 13/0048; H04N 13/0059; H04N 2213/007; H04N 13/0003
USPC .......................................... 348/43
See application file for complete search history.

(56) References Cited

U.S. PATENT DOCUMENTS 5,802,410 A  9/1998 Wah Lo et al.
6,097,850 A * 8/2000 Watanabe et al. ............. 382/275
(Continued)

FOREIGN PATENT DOCUMENTS

JP 07-230556 A 8/1995
JP 2004274253 A 9/2004
(Continued)

OTHER PUBLICATIONS

3GPP2 (3rd Generation Partnership Project 2) File Formats for Multimedia Services document code 3GPP2 C.S0050-0, Version 1.0, dated Dec. 12, 2003 by 3GPP2 ISO Organizational Partners et al.*
The Principal Point and CCD Camera, Clarke et al., pp. 293-312; 1998; URL: http://www.optical-metrology-centre.com/Downloads/Papers/Photogrammetric%20Record%201998%20Principal%20Point.*
(Continued)

*Primary Examiner* — Tonia L Dollinger
*Assistant Examiner* — Kishin G Belani
(74) *Attorney, Agent, or Firm* — Sughrue Mion, PLLC

(57) ABSTRACT

Provided are a method and apparatus for encoding and decoding a stereoscopic image. A stereoscopic image restoring method includes parsing a received data stream into image data of a stereoscopic image and information regarding the stereoscopic image; extracting a camera parameter depending on individual characteristics of each of one or more cameras which have captured the stereoscopic image; and decoding and restoring the image data of the stereoscopic image.

20 Claims, 13 Drawing Sheets

(51) Int. Cl.
    *G06K 9/00*                 (2006.01)
    *G06G 7/48*                 (2006.01)
    *H04N 19/597*           (2014.01)

(56) References Cited

U.S. PATENT DOCUMENTS

| | | | |
|---|---|---|---|
| 8,565,530 | B2 | 10/2013 | Lee |
| 2003/0179923 | A1* | 9/2003 | Xiong et al. .................. 382/154 |
| 2005/0091019 | A1* | 4/2005 | Clavadetscher ................... 703/8 |
| 2007/0008575 | A1* | 1/2007 | Yu et al. ........................ 358/1.15 |
| 2008/0002878 | A1* | 1/2008 | Meiyappan .................. 382/154 |

FOREIGN PATENT DOCUMENTS

| | | |
|---|---|---|
| KR | 1020050058767 A | 6/2005 |
| KR | 10-2006-0104671 A | 10/2006 |
| WO | 2006104351 A1 | 10/2006 |
| WO | 2009048216 A1 | 4/2009 |

OTHER PUBLICATIONS

How to find the principal point in an image? pp. 1-3 (only p. 1 included for illustration porpose), 2011 URL: http://physics.stackexchange.com/questions/11594/how-to-find-the-principal-point-in-an-image.*

Communication dated May 29, 2014, issued by the Korean Intellectual Property Office in counterpart Korean Application No. 10-2008-0071897.

Communication dated Aug. 3, 2012 issued by the Intellectual Property Office of P.R. China in counterpart Chinese Application No. 200980119332.9.

Communication dated Jul. 13, 2012 by the Mexican Patent Office in counterpart Mexican Application No. MX/a/2010/012948.

Communication, dated May 24, 2013, issued by the Vietnamese Patent Office in counterpart Vietnamese Application No. 1-2010-03528.

Communication dated Sep. 10, 2013, issued by the Japanese Patent Office in counterpart Japanese Application No. 2011-511493.

\* cited by examiner

|  | TRANSLATION | ROTATION |
|---|---|---|
| PRIMARY VIEW | (0, 0, 0) | [1 0 0]<br>[0 1 0] = I<br>[0 0 1] |
| SECONDARY VIEW | (lx, ly, lz) | R=f(a, b, c) |

| | | | | |
|---|---|---|---|---|
| 910 | ftyp | | | file type and compatibility<br>major_brand = "ssav" |
| 950 | ... | | | |
| 920 | moov | | | container for all the metadata of timed resources |
| 970 | | ... | | |
| 960 | | trak | | container for an individual track or stream indicate Main AV data or auxiliary data |
| 966 | | | ... | |
| 962 | | | mdia | container for the media information in a track |
| 964 | | | | ... |
| 930 | mdat | | | media data container |
| 940 | meta | | | Metadata |
| 980 | | scdi | | stereoscopic camera and display information |
| 990 | | ... | | |

```
aligned(8) class StereoscopicCameraAndDisplayInformationBox extends
        FullBox('scdi', version = 0, 0){
unsigned int (16) item_count;
for( i=0; i<item_count; i++ ){
        unsigned int(16)    item_ID;
        unsigned int(1)     is_item_ID_ref;
        unsigned int(7)     reserved;
        if(is_item_ID_ref){
                unsigned int(16)    ref_item_ID;
        }
        else{
                // stereoscopic display information
                unsigned int(1)     is_display_safety_info;
                unsigned int(7)     reserved;
                if(is_display_safety_info) {
1020            unsigend int(16)    expected_display_width;
                unsigend int(16)    expected_display_height;
                unsigend int(16)    expected_viewing_distance;
                int(16)                         min_of_disparity;
                int(16)                         max_of_disparity;
                }
                // stereoscopic camera information
                unsigned int(1)     is_cam_params;
                unsigned int(7)     reserved;
                if(is_cam_params){
                        unsgiend int(32)            baseline;
1040                    unsigned int(32)            focal_length;
                        unsigned int(32)    convergence_distance;
                        unsigned int(1)             is_camera_cross;
                        unsigned int(7)             reserved;
                        if (is_camera_cross){
                                unsigned int(32)    rotation;
                        }
                }
        }
}
}
```

FIG. 11

```
// stereoscopic camera information
      unsigned int(1)   is_cam_params;
      unsigned int(7 reserved;
      if(is_cam_params){
            unsigned int(1)   is_different_focal_length;   —1110
unsigned int(1)   is_camera_cross;
      unsigned int(6)   reserved;
      unsgiend int(32)      baseline;
      unsigned int(32)      primary_focal_length;   —1120
      if(is_different_focal_length)   —1130
         unsigned int(32)         secondary_focal_length;   —1140
      unsigned int(32) convergence_distance;
      if (is_camera_cross){
         unsigned int(32)  rotation;
      }
   }
```

FIG. 12

```
// stereoscopic camera information
      unsigned int(1)   is_cam_params;
      unsigned int(7)   reserved;
      if(is_cam_params){
         unsgiend int(32)      baseline;
         unsigned int(32)      primary_focal_length;   —1220
         unsigned int(32)      secondary_focal_length;—1240
         unsigned int(32) convergence_distance;
         unsigned int(1)       is_camera_cross;
         unsigned int(7)       reserved;
         if (is_camera_cross){
            unsigned int(32)  rotation;
         }
      }
```

FIG. 13

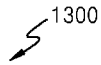

```
// stereoscopic camera information
        unsigned int(1)   is_cam_params;
        unsigned int(6)   reserved;
        if(is_cam_params){
              unsigned int(1)    is_camera_cross;
              unsigned int(7)    reserved;
              unsgiend int(32)   baseline;
              unsigned int(32)   hor_focal_length;  — 1320
              unsigned int(32)   ver_focal_length;  — 1340
              unsigned int(32)  convergence_distance;
              if (is_camera_cross){
                  unsigned int(32)  rotation;
              }
        }
```

FIG. 14

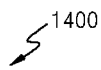

```
// stereoscopic camera information
        unsigned int(1)   is_cam_params;
        unsigned int(6)   reserved;
        if(is_cam_params){
              unsigned int(1)    is_camera_cross;
              unsigned int(7)    reserved;
              unsgiend int(32)   baseline;
              unsigned int(32)   hor_focal_length;  — 1420
              unsigned int(32)   aspect_ratio;      — 1440
              unsigned int(32)  convergence_distance;
              if (is_camera_cross){
                  unsigned int(32)  rotation;
              }
        }
```

// stereoscopic camera information
        unsigned int(1)   is_cam_params;
        unsigned int(6)   reserved;
if(is_cam_params){
        unsigned int(1)    is_camera_cross;
        unsigned int(1)    is_aspect_ratio;  ─ 1510
        unsigned int(7)    reserved;
        unsgiend int(32)   baseline;
        unsigned int(32)   hor_focal_length; ─ 1520
if (is_aspect_ratio) ─ 1530
        unsigned int(32)   aspect_ratio;  ─ 1540
        unsigned int(32) convergence_distance;
if (is_camera_cross){
        unsigned int(32) rotation;
}
        }
```

// stereoscopic camera information
        unsigned int(1)   is_cam_params;
        unsigned int(6)   reserved;
        if(is_cam_params){
           unsigned int(1)     is_camera_cross;
           unsigned int(7)     reserved;
           unsgiend int(32)    baseline;
           unsigned int(32)    focal_length;
           unsigned int(32) convergence_distance;
           unsigned int(32) primary_principal_x;  ─ 1640
           unsigned int(32) primary_principal_y;  ─ 1650
           unsigned int(32) secondary_principal_x; ─ 1660
           unsigned int(32) secondary_principal_y; ─ 1670
           if (is_camera_cross){
              unsigned int(32) rotation;
           }
        }
```

// stereoscopic camera information
      unsigned int(1)　is_cam_params;
      unsigned int(6)　reserved;
      if(is_cam_params){
          unsigned int(1)　　　is_camera_cross;
          unsigned int(1)　　　is_principal_point; — 1710
          unsigned int(6)　　　reserved;
          unsgiend int(32)　　baseline;
          unsigned int(32)　　focal_length;
          unsigned int(32)　　convergence_distance;
if(is_principal_info){ — 1730
          unsigned int(32)　primary_principal_x; — 1740
          unsigned int(32)　primary_principal_y; — 1750
          unsigned int(32)　secondary_principal_x; — 1760
          unsigned int(32)　secondary_principal_y; — 1770
}
          if (is_camera_cross){
             unsigned int(32)　rotation;
          }
      }

// stereoscopic camera information
      unsigned int(1)　is_cam_params;
      unsigned int(6)　reserved;
      if(is_cam_params){
          unsgiend int(32)　　　baseline;
          unsigned int(32)　　　focal_length;
          unsigned int(32)　convergence_distance;
          unsigned int(1)　　　is_camera_cross;
          unsigned int(7)　　　reserved;
          if (is_camera_cross){
             unsigned int(32)　rotation[9]; — 1820
          }
      }

मेथड AND APPARATUS FOR GENERATING STEREOSCOPIC IMAGE DATA STREAM BY USING CAMERA PARAMETER, AND METHOD AND APPARATUS FOR RESTORING STEREOSCOPIC IMAGE BY USING CAMERA PARAMETER

CROSS-REFERENCE TO RELATED PATENT APPLICATION

This application claims the benefit of U.S. Provisional Application No. 61/056,174, filed on May 27, 2008, in the U.S. Patent and Trademark Office, and the benefit of Korean Patent Application No. 10-2008-0071897, filed on Jul. 23, 2008, in the Korean Intellectual Property Office, the disclosures of which are incorporated herein in their entirety by reference.

BACKGROUND OF THE INVENTION

1. Field of the Invention

Methods and apparatuses consistent with the present invention relate to encoding and decoding a stereoscopic image.

2. Description of the Related Art

Currently, research is being actively conducted on three-dimensional (3D) image display methods in order to represent image data more realistically and with a more natural feeling. Among the 3D image display methods, 3D image display methods in which left and right view images are separately displayed at corresponding positions of a conventional display device such that different images are formed to separately correspond to left and right eyes of a viewer, thereby providing a 3D effect by exploiting characteristics of human vision, are regarded to have potential for a variety of reasons. A portable terminal having a barrier liquid crystal display (LCD) as an example of a device in which the 3D image display method can be employed, may provide more realistic images to users while reproducing stereoscopic contents.

SUMMARY OF THE INVENTION

The present invention provides a method and apparatus for encoding and decoding a stereoscopic image.

According to an aspect of the present invention, there is provided a stereoscopic image data stream generating method including encoding image data of a stereoscopic image; determining a camera parameter based on individual characteristics of each of one or more cameras which have captured the stereoscopic image; and inserting the image data and the camera parameter into a data stream.

The determining the camera parameter may include determining a primary focal length parameter representing a primary focal length of a primary view camera of the one or more cameras and a secondary focal length parameter representing a secondary focal length of a secondary view camera of the one or more cameras.

The determining the camera parameter may further include determining a focal length difference parameter indicating whether a primary focal length of the primary view camera of the one or more cameras is different from a secondary focal length of the secondary view camera of the one or more cameras.

If the focal length difference parameter indicates that the primary focal length is identical to the secondary focal length, the determining the camera parameter may further include determining one of a primary focal length parameter representing the primary focal length and a secondary focal length parameter representing the secondary focal length.

If the focal length difference parameter indicates that the primary focal length is different from the secondary focal length, the determining the camera parameter may further include determining a primary focal length parameter representing the primary focal length and a secondary focal length parameter representing the secondary focal length.

The determining the camera parameter may further include determining a horizontal focal length parameter representing a horizontal component of a focal length of the camera and a vertical focal length parameter representing a vertical component of the focal length of the camera.

The determining the camera parameter may further include determining a focal length aspect ratio parameter representing an aspect ratio between a horizontal component and a vertical component of a focal length of the camera; and determining one of a horizontal focal length parameter representing the horizontal component of the focal length and a vertical focal length parameter representing the vertical component of the focal length.

The determining the camera parameter may further include determining a focal length aspect ratio use parameter indicating whether information regarding a focal length of the camera is set based on an aspect ratio between a horizontal component and a vertical component of the focal length.

If the focal length aspect ratio use parameter indicates that the aspect ratio between the horizontal component and the vertical component of the focal length is used, the determining the camera parameter may further include determining a focal length aspect ratio parameter representing the aspect ratio between the horizontal component and the vertical component of the focal length.

If the focal length aspect ratio use parameter indicates that the aspect ratio between the horizontal component and the vertical component of the focal length is not used, the determining the camera parameter may further include determining the aspect ratio between the horizontal component and the vertical component of the focal length to have a value '1'.

The determining the camera parameter may further include determining a primary principal point parameter representing a principal point of a primary view image of the stereoscopic image and a secondary principal point parameter representing a principal point of a secondary view image of the stereoscopic image.

The determining the camera parameter may include determining each of the primary principal point parameter and the secondary principal point parameter for x and y components.

The determining the camera parameter may include determining a principal point information setting parameter indicating whether information regarding each of principal points of a primary view image and a secondary view image of the stereoscopic image is set.

If the principal point information setting parameter indicates that the information regarding the principal point is set, the determining the camera parameter may further include determining a primary principal point parameter representing the principal point of the primary view image of the stereoscopic image and a secondary principal point parameter representing the principal point of the secondary view image of the stereoscopic image, and each of the primary principal point parameter and the secondary principal point parameter may be determined for x and y components.

If the principal point information setting parameter indicates that the information regarding the principal point is not set, the determining the camera parameter may further include determining that a center point of an area which is photographed by a predetermined view camera of the one or more cameras matches a principal point of a predetermined view image of the stereoscopic image.

The determining the camera parameter may include determining an x axis rotation angle parameter representing a rotation angle with respect to an x axis, a y axis rotation angle parameter representing a rotation angle with respect to a y axis, and a z axis rotation angle parameter representing a rotation angle with respect to a z axis, from among rotation angles of the camera.

The determining the camera parameter may include determining a rotation angle parameter in which the rotation angle with respect to the x axis, the rotation angle with respect to the y axis, and the rotation angle with respect to the z axis are represented as one of a 3×3 matrix and a nine-bit array.

If the data stream is an International Standards Organization (ISO)-based media file format, the ISO-based media file format may include a moov box, an mdat box, and a first meta box, and the inserting may include inserting the camera parameter into at least one of a sub level box of the first meta box, a first sub level box of the moov box, a first sub level box of a trak box which is a second sub level box of the moov box, and a sub level box of a second meta box which is a second sub level box of the trak box.

According to another aspect of the present invention, there is provided a stereoscopic image restoring method including parsing a received data stream into image data of a stereoscopic image and information regarding the stereoscopic image; extracting a camera parameter depending on individual characteristics of each of one or more cameras which have captured the stereoscopic image; and decoding and restoring the image data of the stereoscopic image.

The decoding and restoring may include reproducing the image data of the stereoscopic image using the camera parameter.

The extracting the camera parameter may include extracting a primary focal length parameter representing a primary focal length of a primary view camera of the one or more cameras and a secondary focal length parameter representing a secondary focal length of a secondary view camera of the one or more cameras.

The extracting the camera parameter may further include extracting a focal length difference parameter indicating whether a primary focal length of a primary view camera of the one or more cameras is different from a secondary focal length of a secondary view camera of the one or more cameras.

If the focal length difference parameter indicates that the primary focal length is identical to the secondary focal length, the extracting the camera parameter may further include extracting one of a primary focal length parameter representing the primary focal length and a secondary focal length parameter representing the secondary focal length.

If the focal length difference parameter indicates that the primary focal length is different from the secondary focal length, the extracting the camera parameter may further include extracting a primary focal length parameter representing the primary focal length and a secondary focal length parameter representing the secondary focal length.

The extracting the camera parameter may further include extracting a horizontal focal length parameter representing a horizontal component of a focal length of the camera and a vertical focal length parameter representing a vertical component of the focal length of the camera.

The extracting the camera parameter may further include extracting a focal length aspect ratio parameter representing an aspect ratio between a horizontal component and a vertical component of a focal length of the camera; and extracting one of a horizontal focal length parameter representing the horizontal component of the focal length and a vertical focal length parameter representing the vertical component of the focal length.

The extracting the camera parameter may further include extracting a focal length aspect ratio use parameter indicating whether information regarding a focal length of the camera is set by using an aspect ratio between a horizontal component and a vertical component of the focal length.

If the focal length aspect ratio use parameter indicates that the aspect ratio between the horizontal component and the vertical component of the focal length is used, the extracting the camera parameter may further include extracting a focal length aspect ratio parameter representing the aspect ratio between the horizontal component and the vertical component of the focal length.

If the focal length aspect ratio use parameter indicates that the aspect ratio between the horizontal component and the vertical component of the focal length is not used, the extracting the camera parameter may further include determining the aspect ratio between the horizontal component and the vertical component of the focal length to have a value '1'.

The extracting the camera parameter may further include extracting a primary principal point parameter representing a principal point of a primary view image of the stereoscopic image and a secondary principal point parameter representing a principal point of a secondary view image of the stereoscopic image.

The extracting the camera parameter may include extracting each of the primary principal point parameter and the secondary principal point parameter for x and y components.

The extracting the camera parameter may include extracting a principal point information setting parameter indicating whether information regarding each of principal points of a primary view image and a secondary view image of the stereoscopic image is set.

If the principal point information setting parameter indicates that the information regarding the principal point is set, the extracting the camera parameter may further include extracting a primary principal point parameter representing the principal point of the primary view image of the stereoscopic image and a secondary principal point parameter representing the principal point of the secondary view image of the stereoscopic image, and each of the primary principal point parameter and the secondary principal point parameter is extracted for x and y components.

If the principal point information setting parameter indicates that the information regarding the principal point is not set, the extracting of the camera parameter may further include determining that a center point of an area which is photographed by a predetermined view camera of the one or more cameras matches a principal point of a predetermined view image of the stereoscopic image.

The extracting the camera parameter may include extracting an x axis rotation angle parameter representing a rotation angle with respect to an x axis, a y axis rotation angle parameter representing a rotation angle with respect to a y axis, and a z axis rotation angle parameter representing a rotation angle with respect to a z axis, from among rotation angles of the camera.

The extracting the camera parameter may include extracting a rotation angle parameter in which the rotation angle based on the x axis, the rotation angle based on the y axis, and the rotation angle based on the z axis are represented as one of a 3×3 matrix and a nine-bit array.

If the data stream is an International Standards Organization (ISO)-based media file format, the ISO-based media file format may include a moov box, an mdat box, and a first meta box, and the parsing may include extracting the camera parameter from at least one of a sub level box of the first meta box, a first sub level box of the moov box, a first sub level box of a trak box which is a second sub level box of the moov box, and a sub level box of a second meta box which is a second sub level box of the trak box; and extracting the image data of the stereoscopic image from the mdat box.

According to another aspect of the present invention, there is provided a computer readable recording medium having recorded thereon a computer program for executing a stereoscopic image restoring method, the method including parsing a received data stream into image data of a stereoscopic image and information regarding the stereoscopic image; extracting a camera parameter depending on individual characteristics of each of one or more cameras which have captured the stereoscopic image; and decoding and restoring the image data of the stereoscopic image.

According to another aspect of the present invention, there is provided a computer readable recording medium having recorded thereon a computer program for executing a stereoscopic image data stream generating method, the method including encoding image data of a stereoscopic image; determining a camera parameter based on individual characteristics of each of one or more cameras which have captured the stereoscopic image; and inserting the image data and the camera parameter into a data stream.

According to another aspect of the present invention, there is provided a stereoscopic image data stream generating apparatus including an image data encoding unit encoding image data of a stereoscopic image; a camera parameter determination unit determining a camera parameter based on individual characteristics of each camera of one or more cameras which have captured the stereoscopic image; and a data stream insertion unit inserting the image data and the camera parameter into a data stream.

The camera parameter determination unit may include a focal length parameter determination unit determining a focal length of a predetermined view camera of the one or more cameras, and the focal length parameter determination unit may separately determine a primary focal length parameter representing a focal length of a primary view camera of the one or more cameras and a secondary focal length parameter representing a focal length of a secondary view camera of the one or more cameras.

The camera parameter determination unit may further include a focal length difference parameter determination unit determining a focal length parameter difference indicating whether a focal length of a primary view camera of the one or more cameras is different from a secondary focal length parameter representing a focal length of a secondary view camera of the one or more cameras.

If the focal length difference parameter indicates that the primary focal length is identical to the secondary focal length, the focal length parameter determination unit may determine one of a primary focal length parameter representing the primary focal length and a secondary focal length parameter representing the secondary focal length.

If the focal length difference parameter indicates that the primary focal length is different from the secondary focal length, the focal length parameter determination unit may determine a primary focal length parameter representing the primary focal length and a secondary focal length parameter representing the secondary focal length.

The camera parameter determination unit may include a focal length parameter determination unit determining a focal length of a predetermined view camera of the one or more cameras, and the focal length parameter determination unit may determine a primary focal length parameter representing the primary focal length of the camera and a secondary focal length parameter representing the secondary focal length of the camera.

The camera parameter determination unit may include a focal length parameter determination unit determining a focal length of a predetermined view camera of the one or more cameras; and a focal length aspect ratio parameter determination unit determining a focal length aspect ratio parameter representing an aspect ratio between a horizontal component and a vertical component of a focal length of the camera, and the focal length parameter determination unit may determine one of a horizontal focal length parameter representing the horizontal component of the focal length and a vertical focal length parameter representing the vertical component of the focal length.

The camera parameter determination unit may further include a focal length aspect ratio use parameter determination unit determining a focal length aspect ratio use parameter indicating whether information regarding a focal length of the camera is set by using an aspect ratio between a horizontal component and a vertical component of the focal length.

If the focal length aspect ratio use parameter indicates that the aspect ratio between the horizontal component and the vertical component of the focal length is used, the focal length aspect ratio parameter determination unit may determine a focal length aspect ratio parameter representing the aspect ratio between the horizontal component and the vertical component of the focal length.

If the focal length aspect ratio use parameter indicates that the aspect ratio between the horizontal component and the vertical component of the focal length is not used, the focal length aspect ratio parameter determination unit may determine the aspect ratio between the horizontal component and the vertical component of the focal length to have a value '1'.

The camera parameter determination unit may further include a principal point parameter determination unit determining information regarding a principal point of a predetermined view image of the stereoscopic image, and the principal point parameter determination unit may separately determine a primary principal point parameter representing a principal point of a primary view image of the stereoscopic image and a secondary principal point parameter representing a principal point of a secondary view image of the stereoscopic image.

The principal point parameter determination unit may determine each of the primary principal point parameter and the secondary principal point parameter for x and y components.

The camera parameter determination unit may include a principal point information setting parameter determination unit determining a principal point information setting parameter indicating whether information regarding each of principal points of a primary view image and a secondary view image of the stereoscopic image is set.

The camera parameter determination unit may include a principal point parameter determination unit determining information regarding a principal point of a predetermined view image of the stereoscopic image, based on the principal point information setting parameter, and, if the principal point information setting parameter indicates that the information regarding the principal point is set, the principal point parameter determination unit may separately determine a primary principal point parameter representing the principal point of the primary view image of the stereoscopic image and a secondary principal point parameter representing the principal point of the secondary view image of the stereoscopic image, and each of the primary principal point parameter and the secondary principal point parameter may be determined for x and y components.

The camera parameter determination unit may include a principal point parameter determination unit determining information regarding a principal point of a predetermined view image of the stereoscopic image, based on the principal point information setting parameter, and, if the principal point information setting parameter indicates that the information regarding the principal point is not set, the principal point parameter determination unit may determine that a center point of an area which is photographed by a predetermined view camera of the one or more cameras matches a principal point of a predetermined view image of the stereoscopic image.

The camera parameter determination unit may include a rotation angle parameter determination unit determining information regarding a rotation angle of the camera, and the rotation angle parameter determination unit may determine an x axis rotation angle parameter representing a rotation angle with respect to an x axis, a y axis rotation angle parameter representing a rotation angle with respect to a y axis, and a z axis rotation angle parameter representing a rotation angle with respect to a z axis, from among rotation angles of the camera.

The rotation angle parameter determination unit may determine a rotation angle parameter in which the rotation angle with respect to the x axis, the rotation angle with respect to the y axis, and the rotation angle with respect to the z axis are represented in a 3×3 matrix or a nine-bit array.

If the data stream is an International Standards Organization (ISO)-based media file format, the ISO-based media file format may include a moov box, an mdat box, and a first meta box, and the data stream insertion unit may insert the camera parameter into at least one of a sub level box of the first meta box, a first sub level box of the moov box, a first sub level box of a trak box which is a second sub level box of the moov box, and a sub level box of a second meta box which is a second sub level box of the trak box.

According to another aspect of the present invention, there is provided a stereoscopic image restoring apparatus including a parsing unit parsing image data of a stereoscopic image and information regarding the stereoscopic image from a received data stream; a camera parameter extraction unit extracting a camera parameter depending on individual characteristics of each camera of one or more cameras which have captured the stereoscopic image; and an image data decoding unit decoding and restoring the image data of the stereoscopic image.

The stereoscopic image restoring apparatus may further include a reproduction unit reproducing the image data of the stereoscopic image by using the camera parameter.

The camera parameter extraction unit may include a focal length parameter extraction unit extracting information regarding a focal length of a predetermined view camera of the one or more cameras, and the focal length parameter extraction unit may separately extract a primary focal length parameter representing a focal length of a primary view camera of the one or more cameras and a secondary focal length parameter representing a focal length of a secondary view camera of the one or more cameras.

The camera parameter extraction unit may further include a focal length difference parameter extraction unit extracting a focal length difference parameter indicating whether a focal length of a primary view camera of the one or more cameras is different from a secondary focal length parameter representing a focal length of a secondary view camera of the one or more cameras.

The camera parameter extraction unit may include a focal length parameter extraction unit extracting information regarding a focal length of a predetermined view camera of the one or more cameras, and, if the focal length difference parameter indicates that the primary focal length is identical to the secondary focal length, the focal length parameter extraction unit may extract one of a primary focal length parameter representing the primary focal length and a secondary focal length parameter representing the secondary focal length.

The camera parameter extraction unit may include a focal length parameter extraction unit extracting information regarding a focal length of a predetermined view camera of the one or more cameras, and, if the focal length difference parameter indicates that the primary focal length is different from the secondary focal length, the focal length parameter extraction unit may extract a primary focal length parameter representing the primary focal length and a secondary focal length parameter representing the secondary focal length.

The camera parameter extraction unit may include a focal length parameter extraction unit extracting information regarding a focal length of a predetermined view camera of the one or more cameras, and the focal length parameter extraction unit may extract a horizontal focal length parameter representing a horizontal component of a focal length of the camera and a vertical focal length parameter representing a vertical component of the focal length of the camera.

The camera parameter extraction unit may include a focal length parameter extraction unit extracting information regarding a focal length of a predetermined view camera of the one or more cameras; and a focal length aspect ratio parameter extraction unit extracting a focal length aspect ratio parameter representing an aspect ratio between a horizontal component and a vertical component of a focal length of the camera, and the focal length parameter extraction unit may extract one of a horizontal focal length parameter representing the horizontal component of the focal length and a vertical focal length parameter representing the vertical component of the focal length.

The camera parameter extraction unit may further include a focal length aspect ratio use parameter extraction unit extracting a focal length aspect ratio use parameter indicating whether information regarding a focal length of the camera is set by using an aspect ratio between a horizontal component and a vertical component of the focal length.

If the focal length aspect ratio use parameter indicates that the aspect ratio between the horizontal component and the vertical component of the focal length is used, the focal length aspect ratio parameter extraction unit may extract a focal length aspect ratio parameter representing the aspect ratio between the horizontal component and the vertical component of the focal length.

If the focal length aspect ratio use parameter indicates that the aspect ratio between the horizontal component and the vertical component of the focal length is not used, the focal length aspect ratio parameter extraction unit may determine the aspect ratio between the horizontal component and the vertical component of the focal length to have a value '1'.

The camera parameter extraction unit may include a principal point parameter extraction unit extracting information regarding a principal point of a predetermined view image of the stereoscopic image, and the principal point parameter extraction unit may separately extract a primary principal point parameter representing a principal point of a primary view image of the stereoscopic image and a secondary principal point parameter representing a principal point of a secondary view image of the stereoscopic image.

The principal point parameter extraction unit may extract each of the primary principal point parameter and the secondary principal point parameter for x and y components.

The camera parameter extraction unit may include a principal point information setting parameter extraction unit extracting a principal point information setting parameter indicating whether information regarding each of principal points of a primary view image and a secondary view image of the stereoscopic image is set.

The camera parameter extraction unit may include a principal point parameter extraction unit extracting information regarding a principal point of a predetermined view image of the stereoscopic image, and, if the principal point information setting parameter indicates that the information regarding the principal point is set, the principal point parameter extraction unit may separately extract a primary principal point parameter representing the principal point of the primary view image of the stereoscopic image and a secondary principal point parameter representing the principal point of the secondary view image of the stereoscopic image, and each of the primary principal point parameter and the secondary principal point parameter is extracted for x and y components.

The camera parameter extraction unit may include a principal point parameter extraction unit extracting information regarding a principal point of a predetermined view image of the stereoscopic image, and, if the principal point information setting parameter indicates that the information regarding the principal point is not set, the principal point parameter extraction unit may determine that a center point of an area which is photographed by a predetermined view camera of the one or more cameras matches a principal point of a predetermined view image of the stereoscopic image.

The camera parameter extraction unit may include a rotation angle parameter extraction unit extracting information regarding a rotation angle of the camera, and the rotation angle parameter extraction unit may extract an x axis rotation angle parameter representing a rotation angle with respect to an x axis, a y axis rotation angle parameter representing a rotation angle with respect to a y axis, and a z axis rotation angle parameter representing a rotation angle with respect to a z axis, from among rotation angles of the camera.

The rotation angle parameter extraction unit may extract a rotation angle parameter in which the rotation angle with respect to the x axis, the rotation angle with respect to the y axis, and the rotation angle with respect to the z axis are represented in a 3×3 matrix or a nine-bit array.

If the data stream is an International Standards Organization (ISO)-based media file format, the ISO-based media file format may include a moov box, an mdat box, and a first meta box, and the parsing unit may extract the camera parameter from at least one of a sub level box of the first meta box, a first sub level box of the moov box, a first sub level box of a trak box which is a second sub level box of the moov box, and a sub level box of a second meta box which is a second sub level box of the trak box; and may extract the image data of the stereoscopic image from the mdat box.

BRIEF DESCRIPTION OF THE DRAWINGS

The above and other exemplary aspects of the present invention will become more apparent by the following detailed description of exemplary embodiments, with reference to the attached drawings in which:

FIG. 10 is a diagram illustrating syntax for implementing various parameters regarding a stereoscopic image, according to an exemplary embodiment of the present invention;

FIG. 11 is a diagram illustrating syntax for implementing a camera focal length parameter regarding a stereoscopic image, according to an exemplary embodiment of the present invention;

FIG. 12 is a diagram illustrating syntax for implementing a camera focal length parameter regarding a stereoscopic image, according to another exemplary embodiment of the present invention;

FIG. 13 is a diagram illustrating syntax for implementing a camera focal length parameter regarding a stereoscopic image, according to another exemplary embodiment of the present invention;

FIG. 14 is a diagram illustrating syntax for implementing a camera focal length parameter regarding a stereoscopic image, according to another exemplary embodiment of the present invention;

FIG. 15 is a diagram illustrating syntax for implementing a camera focal length parameter regarding a stereoscopic image, according to another exemplary embodiment of the present invention;

FIG. 16 is a diagram illustrating syntax for implementing a camera principal point parameter regarding a stereoscopic image, according to an exemplary embodiment of the present invention;

FIG. 17 is a diagram illustrating syntax for implementing a camera principal point parameter regarding a stereoscopic image, according to another exemplary embodiment of the present invention;

FIG. 18 is a diagram illustrating syntax for implementing a camera rotation angle parameter regarding a stereoscopic image, according to an exemplary embodiment of the present invention;

DETAILED DESCRIPTION OF EXEMPLARY EMBODIMENTS OF THE INVENTION

Hereinafter, the present invention will be described in detail by explaining exemplary embodiments of the invention with reference to the attached drawings.

Figure 1:
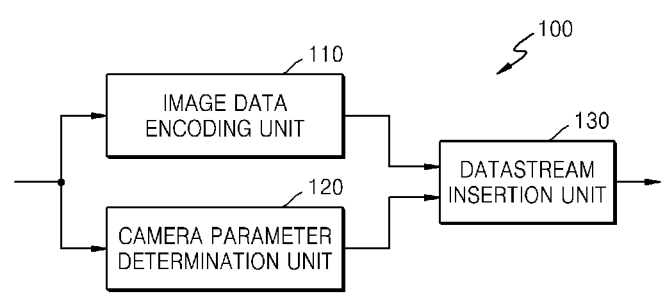
FIG. 1 is a block diagram of a stereoscopic image data stream generating apparatus according to an exemplary embodiment of the present invention.

FIG. 1 is a block diagram of a stereoscopic image data stream generating apparatus 100 according to an embodiment of the present invention.

Referring to FIG. 1, the stereoscopic image data stream generating apparatus 100 includes an image data encoding unit 110, a camera parameter determination unit 120, and a data stream insertion unit 130.

The image data encoding unit 110 encodes image data of a stereoscopic image and outputs the encoded image data to the data stream insertion unit 130. When the stereoscopic image is encoded, primary and secondary view images may be separately encoded or a composite image of the primary and secondary view images may be encoded. Also, the stereoscopic image input into the image data encoding unit 110 to be encoded may be a multiview image or a monoview image.

The camera parameter determination unit 120 determines a camera parameter regarding the stereoscopic image to be encoded, and outputs the camera parameter to the data stream insertion unit 130. A plurality of cameras are required in order to obtain a stereoscopic image, and each camera has a different view. Due to the different views, the camera information may differ from camera to camera, and thus the camera parameters are set individually for each camera.

According to an embodiment of the present invention, the camera parameter determination unit 120 may determine information representing a focal length, a principal point (main point), and a rotation angle/translation for each camera, as the camera parameters. Although not shown in FIG. 1, the camera parameter determination unit 120 may include a focal length parameter determination unit, a principal point parameter determination unit, and a rotation angle parameter determination unit.

The focal length parameter determination unit determines information regarding a focal length of a predetermined view camera of one or more cameras (hereinafter, this information is referred to as a focal length parameter).

The camera parameter determination unit 120 may include a separate focal length parameter determination unit in order to determine whether a focal length of a primary view camera is different from a focal length of a secondary view camera (hereinafter, this information is referred to as a focal length difference parameter).

The camera parameter determination unit 120 may include a focal length aspect ratio parameter determination unit in order to determine a focal length by using a ratio between vertical and horizontal focal lengths (hereinafter, the ratio is referred to as a focal length aspect ratio).

Also, the camera parameter determination unit 120 may include a focal length aspect ratio use parameter determination unit in order to determine information indicating whether the focal length aspect ratio is used (hereinafter, this information is referred to as a focal length aspect ratio use parameter).

The principal point parameter determination unit determines information regarding a principal point of a predetermined view image of a stereoscopic image (hereinafter, the information is referred to as a principal point parameter). The camera parameter determination unit 120 may include a principal point information setting parameter determination unit in order to determine information indicating whether principal point information is set (hereinafter, this information is referred to as a principal point information setting parameter).

The rotation angle parameter determination unit determines information regarding a rotation angle of a predetermined view camera of one or more cameras (hereinafter, this information is referred to as a rotation angle parameter).

The data stream insertion unit 130 generates a stereoscopic image data stream by inserting the encoded image data received from the image data encoding unit 110 and the camera parameters received from the camera parameter determination unit 120, into a data stream.

Each of the encoded image data and the camera parameters are inserted into an appropriate position in the stereoscopic image data stream. A structure of a stereoscopic image data stream into which image data and camera parameters are inserted, will be described later with reference to FIGS. 8 and 9.

Figure 2:
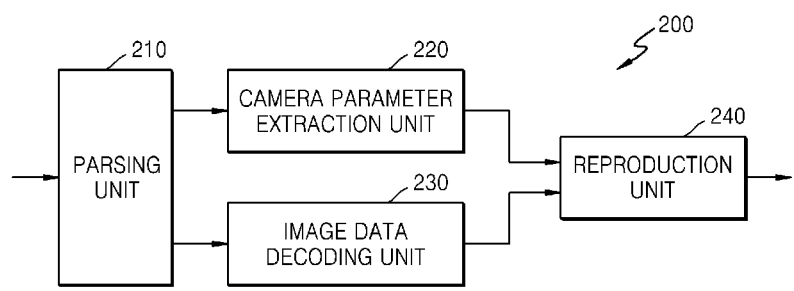
FIG. 2 is a block diagram of a stereoscopic image restoring apparatus according to an exemplary embodiment of the present invention.

FIG. 2 is a block diagram of a stereoscopic image restoring apparatus according to an embodiment of the present invention.

Referring to FIG. 2, the stereoscopic image restoring apparatus 200 includes a parsing unit 210, a camera parameter extraction unit 220, an image data decoding unit 230, and a reproduction unit 240.

The parsing unit 210 parses a received stereoscopic image data stream so as to separate image data of a stereoscopic image from information regarding the stereoscopic image. The parsing unit 210 outputs the image data to the image data decoding unit 230 and outputs the information regarding the stereoscopic image to the camera parameter extraction unit 220.

The camera parameter extraction unit 220 extracts camera parameters from the information received from the parsing unit 210. The camera parameters regarding a stereoscopic image depend on individual characteristics of each camera of the one or more cameras which have captured the stereoscopic image. The extracted camera parameters may be output to the reproduction unit 240.

According to an embodiment of the present invention, the camera parameter extraction unit 220 may extract information representing a focal length, a principal point, and a rotation angle/translation for each camera, as the camera parameters. Although not shown in FIG. 2, the camera parameter extraction unit 220 may include a focal length parameter extraction unit, a principal point parameter extraction unit, and a rotation angle parameter extraction unit.

The focal length parameter extraction unit extracts a focal length parameter.

The camera parameter extraction unit 220 may include a focal length difference parameter extraction unit. The camera parameter extraction unit 220 may determine whether to extract a focal length of each view camera in consideration of whether the focal length of each view camera is identical to the focal length of another view camera, based on the focal length difference parameter extracted by the focal length difference parameter extraction unit.

The camera parameter extraction unit 220 may include a focal length aspect ratio parameter extraction unit. The camera parameter extraction unit 220 may determine whether to extract each of the vertical and horizontal focal lengths, based on a focal length aspect ratio parameter extracted by the focal length aspect ratio parameter extraction unit.

Also, the camera parameter extraction unit 220 may include a focal length aspect ratio use parameter extraction unit. The camera parameter extraction unit 220 may determine whether to extract the focal length aspect ratio parameter, based on a focal length aspect ratio use parameter extracted by the focal length aspect ratio use parameter extraction unit.

The principal point parameter extraction unit extracts a principal point parameter. The camera parameter extraction unit 220 may include a principal point information setting parameter extraction unit. The camera parameter extraction unit 220 may determine whether to extract the principal point parameter, based on the principal point information setting parameter extracted by the principal point information setting parameter extraction unit.

The rotation angle parameter extraction unit extracts a rotation angle parameter of at least one view camera.

The image data decoding unit 230 decodes and restores the image data of the stereoscopic image, and outputs the restored stereoscopic image to the reproduction unit 240. The stereoscopic image is decoded using the compression method that was used when the stereoscopic image was encoded.

The reproduction unit 240 reproduces the restored stereoscopic image using the camera parameters. Since the reproduction unit 240 reproduces the stereoscopic image using the camera parameters and taking into consideration the correlations between different view cameras, the stereoscopic image may be reproduced more accurately.

According to an embodiment of the present invention, the camera parameters may be a single parameter and may include at least one of a focal length parameter, a focal length aspect ratio parameter, a principal point parameter, a rotation angle parameter, and a translation parameter. Each of the focal length parameter, the focal length aspect ratio parameter, and the principal point parameter is a parameter for a single camera and is defined as an in-camera parameter, and each of the rotation angle parameter and the translation parameter is a parameter regarding correlations among a plurality of cameras and is defined as an out-of-camera parameter.

The camera parameter may be applied to various processes such as an epipolar line constraint process and a rectification process, thereby improving the quality of a 3D image.

Specific examples of the use of camera parameters will be described later with reference to FIGS. 10 through 18. In more detail, examples of the use of a focal length parameter (FIGS. 10 through 15), a focal length difference parameter (FIG. 11), a focal length aspect ratio parameter (FIGS. 14 and 15), a focal length aspect ratio use parameter (FIG. 15), a principal point parameter (FIGS. 16 and 17), a principal point information setting parameter (FIG. 17), and a rotation angle parameter (FIG. 18) will be described later with reference to the corresponding drawings.

Figure 3:
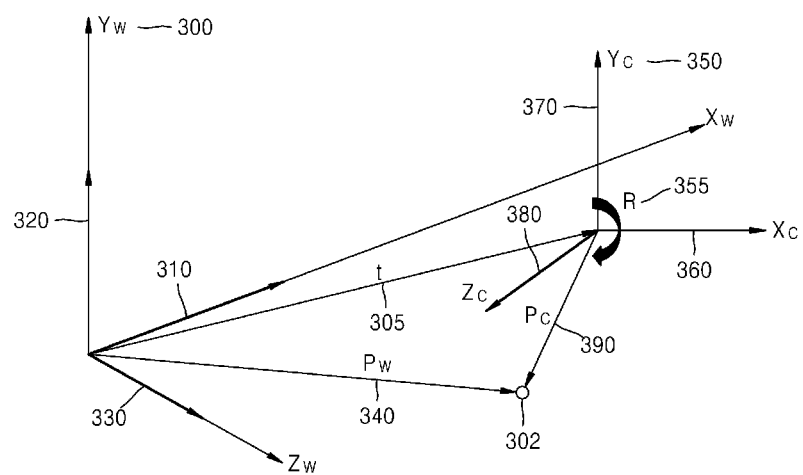
FIG. 3 is a diagram showing a correlation between a world coordinate system and a camera coordinate system.

FIG. 3 is a diagram showing a correlation between a world coordinate system 300 and a camera coordinate system 350.

Referring to FIG. 3, a translation t 305 is a distance between the world coordinate system 300 and the camera coordinate system 350, and a rotation angle R 355 between the world coordinate system 300 and the camera coordinate system 350 is defined by rotation angles in X, Y, and Z axes.

The translation t 305 may be regarded as a distance between the origins of the world coordinate system 300 and the camera coordinate system 350.

The rotation angle R 355 may be determined by: a rotation angle of an X axis $X_C$ 360 of the camera coordinate system 350 with respect to an X axis $X_W$ 310 of the world coordinate system 300; a rotation angle of a Y axis $Y_C$ 370 of the camera coordinate system 350 with respect to a Y axis $Y_W$ 320 of the world coordinate system 300; and a rotation angle of a Z axis $Z_C$ 380 of the camera coordinate system 350 with respect to a Z axis $Z_W$ 330 of the world coordinate system 300. The rotation angle R 355 may be represented as a 3×3 matrix.

A corresponding correlation between a coordinate $M_W$ on the world coordinate system 300 and a coordinate $M_C$ on the camera coordinate system 350 is defined by Equation 1.

$$M_C = R^{-1} M_W - R^{-1} t \qquad (1)$$

If a certain point 302 has a coordinate $P_W$ 340 with regard to the world coordinate system 300, the coordinate $P_W$ 340 matches a coordinate $P_C$ 390 with regard to the camera coordinate system 350 in accordance with Equation 1.

Figure 4:
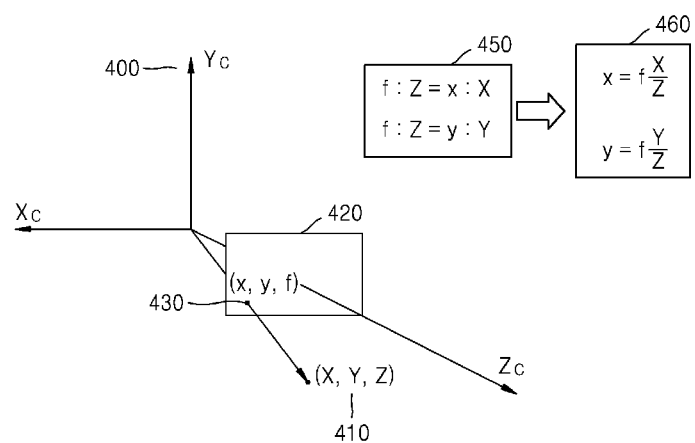
FIG. 4 is a diagram showing a correlation between a coordinate on a camera coordinate system and a corresponding coordinate on an image.

FIG. 4 is a diagram showing a correlation between a certain coordinate (X, Y, Z) 410 on a camera coordinate system 400 and a coordinate (x, y, f) 430 on an image 420. In FIG. 4, the image 420 is arranged perpendicular to a Z axis $Z_C$ of the camera coordinate system 400 (in parallel with the $X_C$-$Y_C$ plane). The coordinate (X, Y, Z) 410 on the camera coordinate system 400 corresponds to the coordinate (x, y, f) 430 on the image 420.

Referring to FIG. 4, a correlation between the coordinate (X, Y, Z) 410 and the coordinate (x, y, f) 430 may be represented by a proportional expression 450 and a relation expression 460, derived from the proportional expression 450. The proportional expression 450 and the relation expression 460 are simplified as shown in Equation 2 below.

$$s \cdot m = A \cdot Mc \qquad (2)$$

In Equation 2, s represents an aspect ratio, m represents the coordinate (x, y, f) 430 on the image 420, A represents an in-camera parameter, and $M_C$ represents the coordinate (X, Y, Z) 410 on the camera coordinate system 400. The aspect ratio s may be represented as s=(sx, sy), and the in-camera parameter A may be represented as A=[-fsx, 0, 0; 0, -fsy, 0; 0, 0, 1].

$$s \cdot m = A \cdot (R^{-1} M_W - R^{-1} t) \qquad (3)$$

A correlation between a coordinate on a world coordinate system and the coordinate (x, y, f) 430 on the image 420 is shown in Equation 3.

A principal point is a crossing point of the image 420 and an optical axis. An area that is photographed by a camera should match the image 420 and thus a center point of the photographed area should match a center point of the image 420. However, mismatch can occur. Also, the center point of the photographed area should match the principal point of the image 420. However, again, mismatch can occur.

Figures 5, 6:
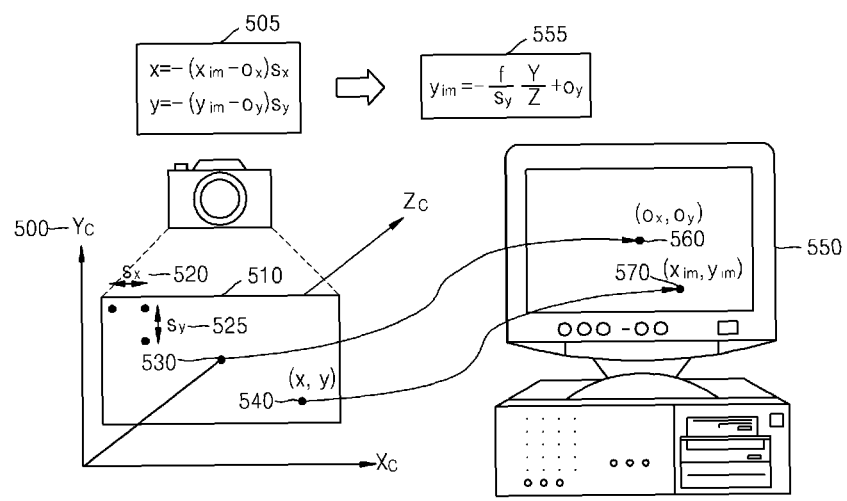
FIG. 5 is a diagram showing a correlation between a coordinate on a photographed image and a coordinate on a reproduction image.
FIG. 6 is a table showing translation information and rotation angle information of a stereoscopic camera.

FIG. 5 is a diagram showing a correlation between a certain coordinate (x, y) 540 on a captured image 510 and a coordinate ($x_{im}$, $y_{im}$) 570 on a reproduced image 500.

Referring to FIG. 5, if the captured image 510 corresponds to the reproduced image 500, an origin 530 of the captured image 510 corresponds to an origin ($o_x$, $o_y$) 560 of the reproduced image 500, and the coordinate (x, y) 540 of the captured image 510 corresponds to the coordinate ($x_{im}$, $y_{im}$) 570 of the reproduced image 500.

If it is assumed that a lateral unit size is sx 520 and a longitudinal unit size is sy 530, based on hardware characteristics of a camera, the correlation between the coordinate (x, y) 540 and the coordinate ($x_{im}$, $y_{im}$) 570 can be defined as a mathematical expression 505. With regard to a y component, if the relation expression 460 is substituted into the mathematical expression 505, a relation expression 555 is derived. The relation expression 555 represents a correlation between the reproduced image 500 and a camera coordinate system.

FIG. 6 is a table showing translation information and rotation angle information of a stereoscopic camera.

Referring to FIG. 6, a correlation between a primary view camera coordinate system and a secondary view camera coordinate system of the stereoscopic camera is determined by using the translation information and the rotation angle information of the two coordinate systems. The correlation between the primary view camera coordinate system and the secondary view camera coordinate system will now be described on the assumption that the primary view camera coordinate system and the secondary view camera coordinate system have the same x axis and that the primary view camera coordinate system is identical to a world coordinate system.

The translation information represents a distance of the secondary view camera coordinate system from the primary view camera coordinate system and, therefore, a translation matrix of the primary view camera coordinate system is (0, 0, 0), and a translation matrix of the secondary view camera coordinate system is represented as $t=(t_x, t_y, t_z)$. Accordingly, the translation information may be represented by using only the translation matrix of the secondary view camera coordinate system.

A rotation angle of the secondary view camera coordinate system is represented with the assumption that the primary view camera coordinate system is the world coordinate system. Thus, a rotation matrix of the primary view camera coordinate system is I=[1,0, 0; 0, 1, 0; 0, 0, 1], and a rotation matrix of the secondary view camera coordinate system is represented as R=f(a, b, c). Accordingly, the rotation information may be represented using only the rotation matrix of the secondary view camera coordinate system.

In general, the rotation information has a structure of a 3×3 matrix. However, alternatively, the rotation information may be represented by using angles with respect to x, y, and z axes. That is, the rotation information may be represented as $R=R(\phi_x, \phi_y, \phi_z)=R(\phi_x)\cdot R(\phi_y)\cdot R(\phi_z)$.

Figure 7:
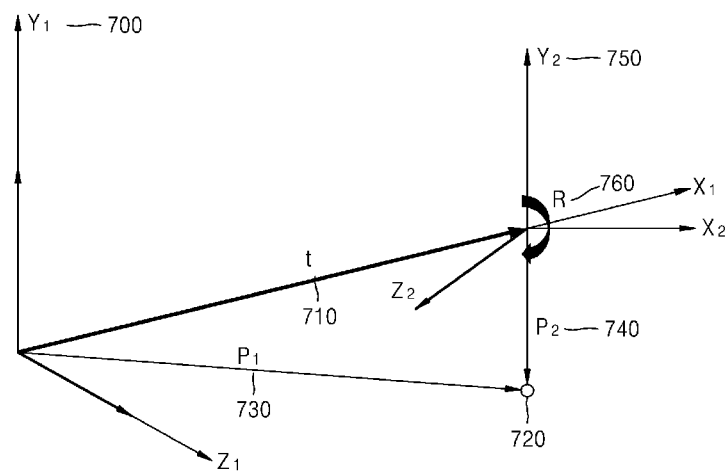
FIG. 7 is a diagram showing a correlation between a primary view camera coordinate system and a secondary view camera coordinate system.

FIG. 7 is a diagram showing a correlation between a primary view camera coordinate system 700 and a secondary view camera coordinate system 750.

Referring to FIG. 7, the correlation between the primary view camera coordinate system 700 and the secondary view camera coordinate system 750 is represented by using translation information and rotation angle information of the two coordinate systems.

In more detail, an origin of the primary view camera coordinate system 700 is translated to an origin of the secondary view camera coordinate system 750 by a translation t 710, and thus the translation information is represented as $t=(t_x, t_y, t_z)$. Also, the primary view camera coordinate system 700 is rotated to the secondary view camera coordinate system 750 by a rotation angle R 760, and thus the rotation angle information is represented as R=f(a, b, c).

Accordingly, a certain coordinate 720 is located at a position $P_1$ 730 with respect to the primary view camera coordinate system 700 and is located at a position $P_2$ 740 with respect to the secondary view camera coordinate system 750. The position $P_1$ 730 and the position $P_2$ 740 may also be defined by the translation t 710 and the rotation angle R 760.

Figure 8:
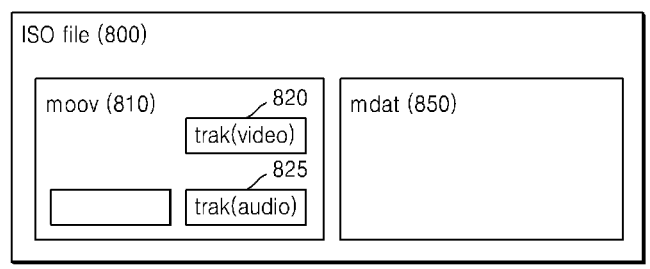
FIG. 8 is a diagram illustrating a structure of an International Standards Organization (ISO)-based media file format.

FIG. 8 is a diagram illustrating a structure of an International Standards Organization (ISO)-based media file format 800.

Referring to FIG. 8, the ISO-based media file format 800 includes a moov box 810 and an mdat box 850.

Basic header information regarding audio and video (AV) data is inserted into the moov box 810. The moov box 810 includes various boxes such as trak boxes 820 and 825. The trak boxes 820 and 825 include information regarding storage locations of the AV data in the mdat box 850. The mdat box 850 includes the AV data in the form of elementary streams (ESs). The ISO-based media file format 800 is an AV data format that is widely used according to the Moving Picture Experts Group-4 (MPEG-4) and the Advanced Video Coding/H.264 (AVC/H.264) standards.

Figure 9:
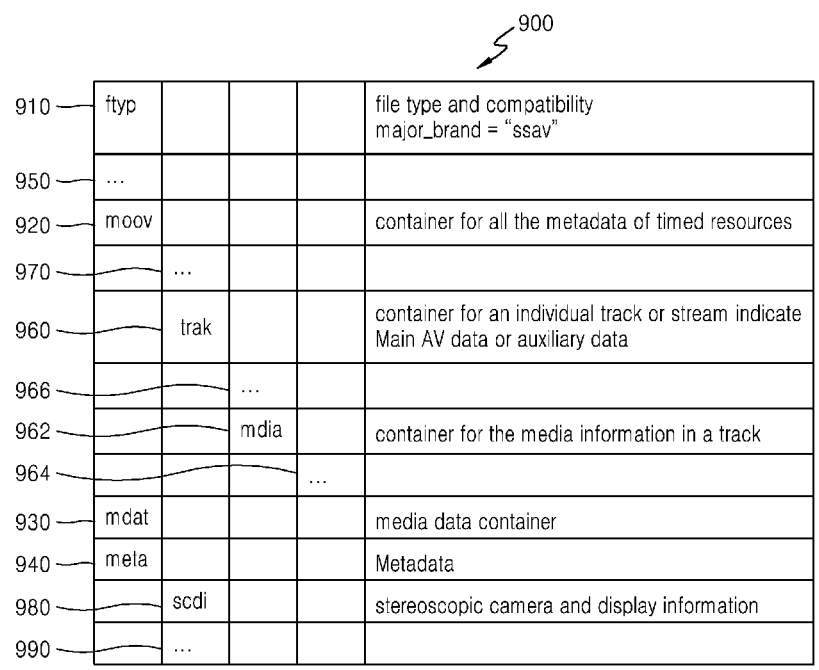
FIG. 9 is a diagram illustrating a list of various boxes of an ISO-based media file format.

FIG. 9 is a diagram illustrating a list 900 of various boxes of an ISO-based media file format.

Referring to FIG. 9, the list 900 of the boxes of the ISO-based media file format has a hierarchical structure. An ftyp box 910, a moov box 920, an mdat box 930, a meta box 940, and other boxes 950 are located at a top level.

The ftyp box 910 contains information regarding a file type and compatibility. In order to represent a stereoscopic image data file format, 'major brand' is set as 'ssav'.

The moov box 920 is a space for all metadata of timed resources. A trak box 960 included in the moov box 920 is a space for information of an individual track or stream which identifies main AV data or auxiliary data. An mdia box 962 included in the trak box 960 is a space for all media information in a track.

The mdat box 930 is a space for media data.

The meta box 940 is a space for metadata. According to an embodiment of the present invention, an scdi box 980 is inserted at a sub level of the meta box 940 and stereoscopic camera information and stereoscopic disparity information are inserted into the scdi box 980.

According to another embodiment of the present invention, the stereoscopic camera information may be inserted into at least one of the boxes 950 located at the top level, a box 970 included in the moov box 920, a box 966 included in the trak box 960, a box 964 included in the mdia box 962, and a box 990 included in the meta box 940.

FIG. 10 is a diagram illustrating syntax 1000 for implementing various parameters regarding a stereoscopic image, according to an embodiment of the present invention.

Referring to FIG. 10, the syntax 1000 uses a disparity information parameter 1020, representing disparity information between view images of the stereoscopic image, and a camera information parameter 1040, representing camera information regarding a stereoscopic camera that has captured the stereoscopic image. In order to implement a camera parameter according to an embodiment of the present invention, the syntax 1000 defining the scdi box 980 illustrated in FIG. 9 may include the following parameters.

An 'item-count' parameter represents the number of items representing fragments of stereoscopic data. If a plurality of fragments have the same camera information and disparity information, the 'item-count' parameter may be set to have a value '1'.

An 'item_ID' parameter represents identification (ID) information of items recorded in an iloc box for stereoscopic fragments. Location information of items is inserted into the iloc box.

An 'is_item_ID ref' parameter represents whether a current item uses a parameter of another item. The 'is_item_ID_ref' parameter represents the 'item_ID' parameter of a reference item. The camera information and the disparity information of the reference item, which are included in an scdi box, have to be available.

An 'is_display_safety_info' parameter represents whether the disparity information is inserted. An 'expected display width' parameter and an 'expected display_height' parameter respectively represent expected display width and height. An 'expected viewing_distance' parameter represents an expected viewing distance. A display width/height or a viewing distance may be defined in millimeters. A 'min of disparity' parameter and a 'max of disparity' parameter respectively represent minimum and maximum disparities of primary and secondary view images.

An 'is_cam_params' parameter represents whether the camera information is inserted. Ai 'baseline' parameter represents a distance between two cameras. A 'focal length' parameter represents a distance from an optical center to an image plane. A 'convergence_distance' parameter represents a distance from a center point of two cameras to a convergence point. An 'is_camera cross' parameter represents whether the stereoscopic camera is arranged in a parallel form or a crossing form.

Data of a stereoscopic image is provided together with camera information and disparity information regarding the stereoscopic image, and thus, if the camera information and the disparity information are used when a restored stereoscopic image is reproduced, a 3D effect of the stereoscopic image may be improved and viewers may feel less fatigue caused by the 3D effect.

Various types of syntax that may be replaced for the camera information parameter 1040 of the syntax 1000 illustrated in FIG. 10, will be now described with reference to FIGS. 11 through 18.

FIG. 11 is a diagram illustrating syntax 1100 for implementing a camera focal length parameter regarding a stereoscopic image, according to an embodiment of the present invention.

Referring to FIG. 11, the syntax 1100 uses an 'is_different_focal_length' parameter 1110. The 'is_different_focal length' parameter 1110 is a focal length difference parameter that is described above with reference to FIG. 1, and represents whether a focal length of a primary view camera (hereinafter referred to as a primary focal length) is different from a focal length of a secondary view camera (hereinafter referred to as a secondary focal length). A 'primary_focal_length' parameter 1120 represents the primary focal length. That is, the primary focal length is used as camera information.

If an if conditional 1130 determines that the 'is_different_focal_length' parameter 1110 has a value '1', a 'secondary_focal_length' parameter 1140 is used. That is, if the focal length difference parameter determines that the primary focal length is different from the secondary focal length, the secondary focal length represented as the 'secondary_focal_length' parameter 1140 is also used.

If the if conditional 1130 determines that the 'is_different_focal_length' parameter 1110 has a value '0', the 'secondary_focal length' parameter 1140 is not used. In this case, the focal length difference parameter determines that the primary focal length is identical to the secondary focal length, and thus the focal lengths of the primary and secondary view cameras may be represented by using only the primary focal length. Although not shown in FIG. 11, the focal lengths of the primary and secondary view cameras may be represented by using only the secondary focal length.

The camera parameter determination unit 120 of the stereoscopic image data stream generating apparatus 100 illustrated in FIG. 1 may include a focal length parameter determination unit, and the focal length parameter determination unit may determine the 'primary_focal_length' parameter 1120. The focal length parameter determination unit may determine whether to determine the 'secondary_focal_length' parameter 1140, based on the 'is_different_focal_length' parameter 1110 determined by a focal length difference parameter determination unit.

Also, the camera parameter extraction unit 220 of the stereoscopic image restoring apparatus 200 illustrated in FIG. 2 may include a focal length parameter extraction unit, and the focal length parameter extraction unit may extract the 'primary_focal_length' parameter 1120. The focal length parameter extraction unit may determine whether to extract the 'secondary_focal_length' parameter 1140, based on the 'is_different_focal_length' parameter 1110 extracted by a focal length difference parameter extraction unit.

FIG. 12 is a diagram illustrating syntax 1200 for implementing a camera focal length parameter regarding a stereoscopic image, according to another embodiment of the present invention.

Referring to FIG. 12, the syntax 1200 does not use the 'is_different_focal_length' parameter 1110 illustrated in FIG. 11 and uses both of a 'primary_focal_length' parameter 1220 and a 'secondary_focal_length' parameter 1240. That is, primary and secondary focal lengths are separately used. Primary and secondary views may respectively be left and right views, or vice versa.

If information regarding the secondary focal length is not stored or transmitted, the secondary focal length is regarded to be identical to the primary focal length.

Thus, the camera parameter determination unit 120 of the stereoscopic image data stream generating apparatus 100 illustrated in FIG. 1 may include a focal length parameter determination unit, and the focal length parameter determination unit may determine the 'primary_focal_length' parameter 1220 and the 'secondary_focal_length' parameter 1240.

Also, the camera parameter extraction unit 220 of the stereoscopic image restoring apparatus 200 illustrated in FIG. 2 may include a focal length parameter extraction unit, and the focal length parameter extraction unit may extract the 'primary_focal_length' parameter 1220 and the 'secondary_focal_length' parameter 1240.

FIG. 13 is a diagram illustrating syntax 1300 for implementing a camera focal length parameter regarding a stereoscopic image, according to another embodiment of the present invention.

A focal length may be represented by horizontal and vertical components.

Referring to FIG. 13, the syntax 1300 uses a 'hor_focal_length' parameter 1320 and a 'ver focal length' parameter 1340. The 'hor_focal_length' parameter 1320 represents the horizontal component of the focal length and the 'ver_focal_length' parameter 1340 represents the vertical component of the focal length.

The camera parameter determination unit 120 of the stereoscopic image data stream generating apparatus 100 illustrated in FIG. 1 may include a focal length parameter determination unit, and the focal length parameter determination unit may determine the 'hor_focal_length' parameter 1320 and the 'ver_focal_length' parameter 1340.

Also, the camera parameter extraction unit 220 of the stereoscopic image restoring apparatus 200 illustrated in FIG. 2 may include a focal length parameter extraction unit, and the focal length parameter extraction unit may extract the 'hor_focal_length' parameter 1320 and the 'ver focal length' parameter 1340.

FIG. 14 is a diagram illustrating syntax 1400 for implementing a camera focal length parameter regarding a stereoscopic image, according to another embodiment of the present invention.

If a focal length aspect ratio that is an aspect ratio between horizontal and vertical components of a focal length, is used, the focal length may be represented by using only one of the horizontal and vertical components.

Referring to FIG. 14, the syntax 1400 uses a 'hor_focal_length' parameter 1420 and an 'aspect_ratio' parameter 1440. The 'hor_focal_length' parameter 1420 represents the horizontal component of the focal length and the 'aspect_ratio' parameter 1440 represents the aspect ratio of the focal length. According to another embodiment of the present invention, a 'ver_focal_length' parameter may be used instead of the 'hor_focal_length' parameter 1420.

The camera parameter determination unit 120 of the stereoscopic image data stream generating apparatus 100 illustrated in FIG. 1 may include a focal length parameter determination unit and a focal length aspect ratio parameter determination unit. The focal length parameter determination unit may determine the 'hor_focal_length' parameter 1420, and the focal length aspect ratio parameter determination unit may determine the 'aspect_ratio' parameter 1440.

Also, the camera parameter extraction unit 220 of the stereoscopic image restoring apparatus 200 illustrated in FIG. 2 may include a focal length parameter extraction unit and a focal length aspect ratio parameter extraction unit. The focal length parameter extraction unit may extract the 'hor_focal_length' parameter 1420, and the focal length aspect ratio parameter extraction unit may extract the 'aspect_ratio' parameter 1440.

FIG. 15 is a diagram illustrating syntax 1500 for implementing a camera focal length parameter regarding a stereoscopic image, according to another embodiment of the present invention.

Referring to FIG. 15, the syntax 1500 uses an 'is_aspect_ratio' parameter 1510. The 'is_aspect_ratio' parameter 1510 is a focal length aspect ratio use parameter that is described above with reference to FIG. 1, and represents whether a focal length aspect ratio is used in order to represent a focal length. A 'hor_focal_length' parameter 1520 represents a horizontal component of a focal length.

If an if conditional 1530 determines the 'is_aspect_ratio' parameter 1510 has a value '1', an 'aspect_ratio' parameter 1540 is used. That is, if it is determined that the focal length aspect ratio is to be used, the 'aspect_ratio' parameter 1540 is declared and used.

If the if conditional 1530 determines that the 'is_aspect_ratio' parameter 1510 has a value '0', the 'aspect_ratio' parameter 1540 is not separately defined. According to an embodiment of the present invention, if the if conditional 1530 determines that the 'is_aspect_ratio' parameter 1510 has a value '0', the 'aspect_ratio' parameter 1540 is not separately defined and is regarded to have a value '1'. That is, if it is determined that the focal length aspect ratio is not to be used, the focal length aspect ratio may be regarded to have a value '1' and thus the a horizontal component of a focal length may be determined to be identical to a vertical component of the focal length.

The camera parameter determination unit 120 of the stereoscopic image data stream generating apparatus 100 illustrated in FIG. 1 may include a focal length parameter determination unit, a focal length aspect ratio parameter determination unit, and a focal length aspect ratio use parameter determination unit. The focal length parameter determination unit may determine the 'hor_focal_length' parameter 1520. The focal length aspect ratio parameter determination unit may determine whether to determine the 'aspect_ratio' parameter 1540, based on the 'is_aspect_ratio' parameter 1510 determined by the focal length aspect ratio use parameter determination unit.

Also, the camera parameter extraction unit 220 of the stereoscopic image restoring apparatus 200 illustrated in FIG. 2 may include a focal length parameter extraction unit, a focal length aspect ratio parameter extraction unit, and a focal length aspect ratio use parameter extraction unit. The focal length parameter extraction unit may extract the 'hor_focal_length' parameter 1520. The focal length aspect ratio parameter extraction unit may determine whether to extract the 'aspect_ratio' parameter 1540, based on the 'is_aspect_ratio' parameter 1510 extracted by the focal length aspect ratio use parameter extraction unit.

FIG. 16 is a diagram illustrating syntax 1600 for implementing a camera principal point parameter regarding a stereoscopic image, according to an embodiment of the present invention.

A principal point is a center point of an image captured by a camera. The principal point is separately represented in each view image and may be represented by using x and y components. According to an embodiment of the present invention, primary and secondary view images may respectively be left and right view images.

Referring to FIG. 16, the syntax 1600 uses a 'primary_principal x' parameter 1640, a 'primary_principal_y' parameter 1650, a 'secondary_principal_x' parameter 1660, and a 'secondary_principal_y' parameter 1670. The 'primary_principal' parameter 1640 represents an x component of a principal point of the primary view image, the 'primary_principal_y' parameter 1650 represents a y component of the principal point of the primary view image, the 'secondary_principal' parameter 1660 represents an x component of a principal point of the secondary view image, and the 'secondary_Principal_y' parameter 1670 represents a y component of the principal point of the secondary view image.

The camera parameter determination unit 120 of the stereoscopic image data stream generating apparatus 100 illustrated in FIG. 1 may include a principal point parameter determination unit. The principal point parameter determination unit may determine the 'primary_principal_x' parameter 1640, the 'primary_principal_y' parameter 1650, the 'secondary_principal_x' parameter 1660, and the 'secondary_principal_y' parameter 1670.

Also, the camera parameter extraction unit 220 of the stereoscopic image restoring apparatus 200 illustrated in FIG. 2 may include a principal point parameter extraction unit. The principal point parameter extraction unit may extract the 'primary_principal_x' parameter 1640, the 'primary_principal' parameter 1650, the 'secondary_principal_x' parameter 1660, and the 'secondary_principal_y' parameter 1670.

FIG. 17 is a diagram illustrating syntax 1700 for implementing a camera principal point parameter regarding a stereoscopic image, according to another embodiment of the present invention.

Referring to FIG. 17, the syntax 1700 uses an 'is_principal_point' parameter 1710. The 'is_principal_point' parameter 1710 is a principal point information setting parameter that is described above with reference to FIG. 1, represents whether principal point information is set, and defines a case when a principal point of an image is different from a center point of a camera.

If an if conditional 1730 determines that the 'is_principal_point' parameter 1710 has a value '1', a 'primary_principal_x' parameter 1740, a 'primary_principal_y' parameter 1750, a 'secondary_principal_x' parameter 1760, and a 'secondary_principal' parameter 1770 are used. That is, if it is determined that the principal point information are to be used, the 'primary_principal_x' parameter 1740, the 'primary_principal_y' parameter 1750, the 'secondary_principal_x' parameter 1760, and the 'secondary_principal_y' parameter 1770 are declared and used.

If the if conditional 1730 determines that the 'is_principal_point' parameter 1710 has a value '0', the 'primary_principal_x' parameter 1740, the 'primary_principal' parameter 1750, the 'secondary_principal_x' parameter 1760, and the 'secondary_principal_y' parameter 1770 are not separately declared and defined. According to an embodiment of the present invention, if the if conditional 1730 determines that the 'is_principal_point' parameter 1710 has a value '0', the 'primary_principal_x' parameter 1740, the 'primary_principal_y' parameter 1750, the 'secondary_principal_x' parameter 1760, and the 'secondary_principal_y' parameter 1770 are not separately defined, and a center point of each view camera is regarded as matching a principal point of each view image.

The camera parameter determination unit 120 of the stereoscopic image data stream generating apparatus 100 illustrated in FIG. 1 may include a principal point parameter determination unit and a principal point information setting parameter determination unit. The principal point parameter determination unit may determine the 'primary_principal_x' parameter 1740, the 'primary principal y' parameter 1750, the 'secondary_principal_x' parameter 1760, and the 'secondary principal y' parameter 1770, based on the 'is_principal_point' parameter 1710 determined by the principal point information setting parameter determination unit.

Also, the camera parameter extraction unit 220 of the stereoscopic image restoring apparatus 200 illustrated in FIG. 2 may include a principal point parameter extraction unit and a principal point information setting parameter extraction unit. The principal point parameter extraction unit may extract the 'primary_Principal_x' parameter 1740, the 'primary principal y' parameter 1750, the 'secondary principal x' parameter 1760, and the 'secondary principal y' parameter 1770, based on the 'is_principal_point' parameter 1710 extracted by the principal point information setting parameter extraction unit.

FIG. 18 is a diagram illustrating syntax 1800 for implementing a camera rotation angle parameter regarding a stereoscopic image, according to an embodiment of the present invention.

Referring to FIG. 18, the syntax 1800 uses a rotation parameter. The rotation parameter represents rotation angle information and may be represented by three angles in x, y, and z directions. Also, the rotation parameter may be represented as 'rotation[3] [3]' in a 3×3 matrix or may be represented as 'rotation[9]' 1820 in a nine-bit array.

Although not shown in FIG. 18, the syntax 1800 may also use a translation parameter. The translation parameter may represent a distance between a primary view camera coordinate system a secondary view camera coordinate system in the form of 'translation[3]'.

Thus, the camera parameter determination unit 120 of the stereoscopic image data stream generating apparatus 100 illustrated in FIG. 1 may include a rotation angle parameter determination unit, and the rotation angle parameter determination unit may determine the 'rotation[9]' 1820.

Also, the camera parameter extraction unit 220 of the stereoscopic image restoring apparatus 200 illustrated in FIG. 2 may include a rotation angle parameter extraction unit, and the rotation angle parameter extraction unit may extract the 'rotation[9]' parameter 1820.

Figure 19:
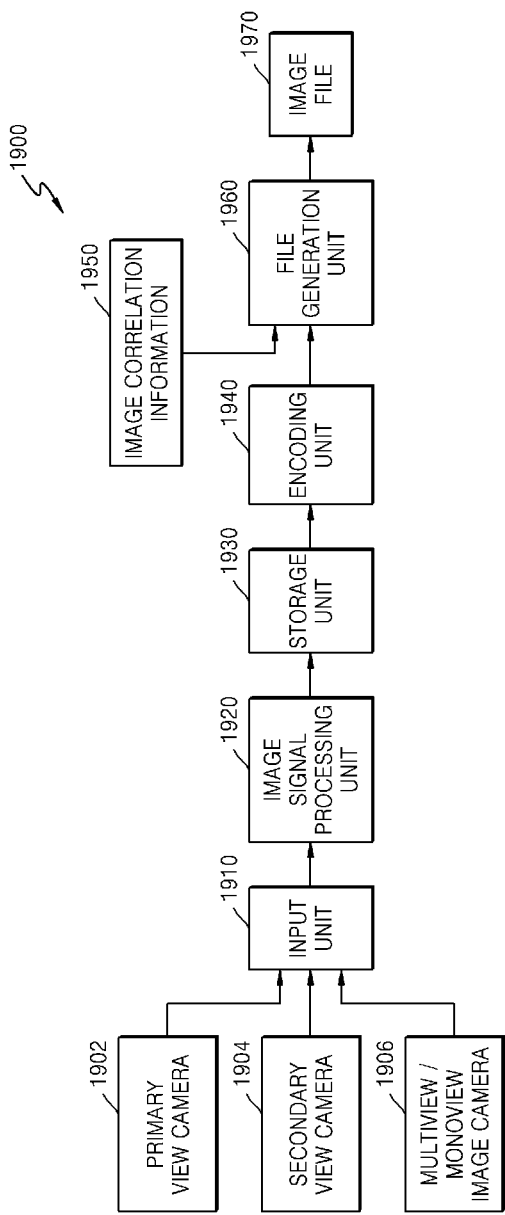
FIG. 19 is a block diagram of a stereoscopic image file generating system using a stereoscopic image data stream generating method, according to an exemplary embodiment of the present invention.

FIG. 19 is a block diagram of a stereoscopic image file generating system using a stereoscopic image data stream generating method, according to an embodiment of the present invention.

Referring to FIG. 19, the stereoscopic image file generation system 1900 includes a primary view camera 1902, a secondary view camera 1904, a stereoscopic/monoview image camera 1906, an input unit 1910, an image signal processing unit 1920, a storage unit 1930, an encoding unit 1940, and a file generating unit 1960.

The primary and secondary view cameras 1902 and 1904 photograph a predetermined subject at primary and secondary views so as to output different primary and secondary view images. If a monoview image is also captured by the stereoscopic image file generation system 1900, a monoscopic image is output from the stereoscopic/monoview image camera 1906. An image output from each of the primary and secondary view cameras 1902 and 1904 and the stereoscopic/monoview image camera 1906 is input to the input unit 1910.

The image input to the input unit 1910 is pre-processed by the image signal processing unit 1920. For example, external image values, which are analog values, are converted into digital values. Here, the term "external image values" denotes components of light and colors which are recognized by a sensor of a charge-coupled device (CCD) type or a complementary metal-oxide semiconductor (CMOS) type.

The storage unit 1930 stores image data of the pre-processed image and provides the image data to the encoding unit 1940. Although the storage unit 1930 is separately illustrated, the stereoscopic image file generation system 1900 may further include other storage elements for buffering between the other elements of the stereoscopic image file generation system 1900, other than the storage unit 1930.

The encoding unit 1940 encodes the image data received from the storage unit 1930. If necessary, the encoding of the image data by the encoding unit 1940 may be omitted.

The file generating unit 1960 inserts image correlation information 1950 and the (encoded) image data received from the encoding unit 1940, into a predetermined file format so as to generate an image file 1970. The image correlation information 1950 may include reference information of a track box for representing correlations between images, and handler information for representing a media type of each image.

Also, the image correlation information 1950 may include two-dimensional (2D) image-related information and 3D image-related information. The 3D image-related information represents a correlation between the primary and secondary view images, and may include information regarding 2D/3D data sections, information regarding an arrangement method of the primary and secondary view images, information regarding an image file type, a camera parameter, display information, and disparity information.

According to an embodiment of the present invention, the file generating unit 1960 may store the image data and the image correlation information 1950, respectively, in a media data region and a header region of the image file 1970. If the image file 1970 is an ISO-based media file format, the image data may be stored in the form of an elementary stream, in an mdat box, and the image correlation information 1950 may be stored in a trak box or any sub-level box of the trak box.

The image file 1970 is input or transmitted to a 3D image file reproduction apparatus.

Figure 20:
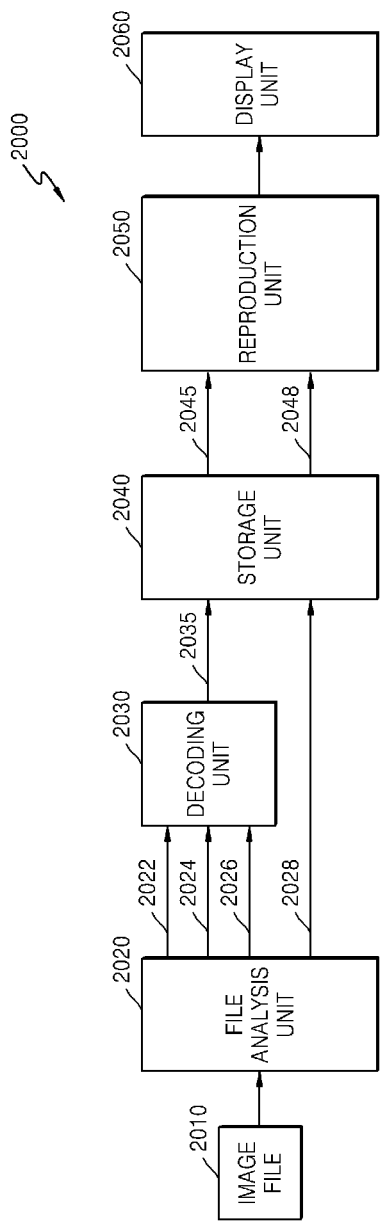
FIG. 20 is a block diagram of a stereoscopic image restoring/reproducing system using a stereoscopic image restoring method, according to an exemplary embodiment of the present invention.

FIG. 20 is a block diagram of a stereoscopic image restoring/reproducing system using a stereoscopic image restoring method, according to an embodiment of the present invention.

Referring to FIG. 20, the stereoscopic image restoration/reproduction system 2000 includes a file parsing unit 2020, a decoding unit 2030, a storage unit 2040, a reproduction unit 2050, and a display unit 2060.

The file parsing unit 2020 parses a received image file 2010. After information stored in each of an ftyp box, a moov box, a trak box, and a meta box is parsed, image data stored in an mdat box may be extracted. Primary view image data 2022, secondary view image data 2024, and stereoscopic/monoview image data 2026 may be extracted as the image data. By parsing the image file 2010, image data-related information 2028 may also be extracted. The image data-related information 2028 may include correlation information between images, such as trak reference information regarding related tracks.

The decoding unit 2030 receives and decodes the image data including the primary view image data 2022, the secondary view image data 2024, and the stereoscopic/monoview image data 2026 which are extracted from the image file 2010. The decoding is performed only if the image data in the image file 2010 has been encoded. The storage unit 2040 receives and stores (decoded) image data 2035 that is output from the decoding unit 2030, and the extracted image data-related information 2028 that is extracted by the file parsing unit 2020.

The reproduction unit 2050 receives image reproduction-related information 2048 and image data 2045 to be reproduced, from the storage unit 2040 so as to reproduce an image. The image reproduction-related information 2048 is information required to reproduce the image from among the image data-related information 2028, and includes image correlation information.

The reproduction unit 2050 may reproduce the image data 2045 in a 2D or 3D image reproduction method, by using the image reproduction-related information 2048. For example, the reproduction unit 2050 may combine and reproduce correlated stereoscopic images by referring to image data identification information. Also, the reproduction unit 2050 may reproduce the correlated stereoscopic images and a monoscopic image together, by referring to the image data identification information and 2D/3D data section information.

The display unit 2060 may display the image reproduced by the reproduction unit 2050, on a screen. The display unit 2060 may be a barrier liquid crystal display (LCD). A monoscopic image may be displayed when the barrier LCD is turned off, and both view images of a stereoscopic image may be simultaneously displayed when the barrier LCD is turned on.

Figure 21:
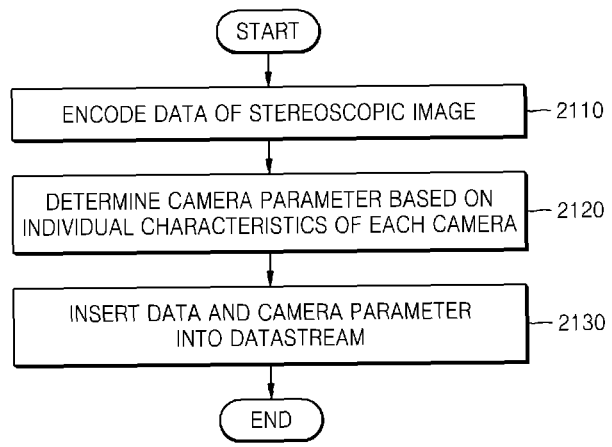
FIG. 21 is a flowchart of a stereoscopic image data stream generating method according to an exemplary embodiment of the present invention.

FIG. 21 is a flowchart of a stereoscopic image data stream generating method according to an embodiment of the present invention.

Referring to FIG. 21, in operation 2110, image data of a stereoscopic image is encoded.

In operation 2120, camera parameters are determined based on individual characteristics of each of one or more cameras which have captured the stereoscopic image. The camera parameters may include a focal-length-related parameter, a principal-point-related parameter, a translation parameter, a rotation angle parameter, and an aspect ratio parameter. The focal-length-related parameter may include focal length information, information indicating whether focal lengths of view cameras are different from each other, and information indicating whether a focal length is represented by an aspect ratio. The principal-point-related parameter may include principal point information, and information indicating whether to separately set a principal point of an image in addition to a center point of a camera.

In operation 2130, the encoded image data and the camera parameters are inserted into a data stream. For example, if the data stream has an ISO-based media file format, the image data may be inserted into an mdat box, and the camera parameters may be inserted into a sub level box of a moov box, a trak box, a sub level box of a trak box, a meta box, or a sub level box of a meta box.

Figure 22:
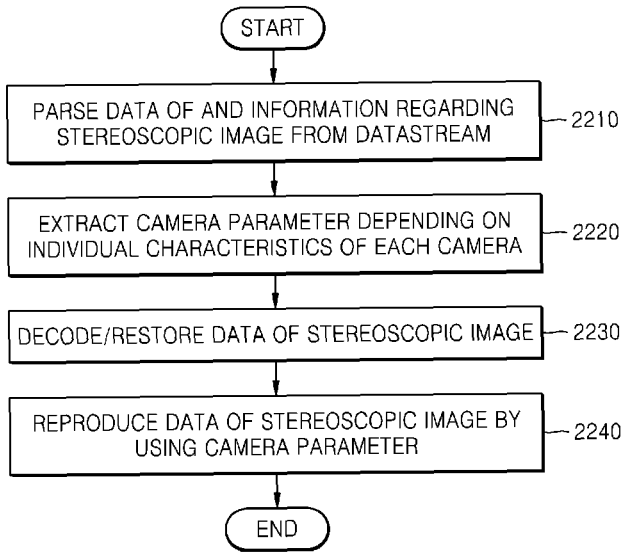
FIG. 22 is a flowchart of a stereoscopic image restoring method according to an exemplary embodiment of the present invention.

FIG. 22 is a flowchart of a stereoscopic image restoring method according to an embodiment of the present invention.

Referring to FIG. 22, in operation 2210, image data of a stereoscopic image and information regarding the stereoscopic image are parsed from a received data stream. For example, if the data stream has an ISO-based media file format, the image data may be parsed from an mdat box, and the information regarding the stereoscopic image may be parsed from a sub level box of a moov box, a trak box, a sub level box of a trak box, a meta box, or a sub level box of a meta box.

In operation 2220, camera parameters, depending on individual characteristics of each of one or more cameras which have captured the stereoscopic image, are extracted. The camera parameters may include a focal-length-related parameter, a principal-point-related parameter, a translation parameter, a rotation angle parameter, and an aspect ratio parameter. Also, a focal length aspect ratio use parameter, a focal length difference parameter, and a principal point information setting parameter may be extracted.

In operation 2230, the image data of the stereoscopic image is decoded and restored.

In operation 2240, the image data of the stereoscopic image is reproduced by using the camera parameters. Each view image may be reproduced and displayed at appropriate times and positions by using the camera parameters and thus a more accurate 2D or 3D image may be provided to users.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and the like.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A stereoscopic image restoring method comprising:
    parsing a received data stream into image data of a stereoscopic image and information regarding the stereoscopic image;
    extracting, based on the parsed information, a camera parameter representing individual characteristics of each of two or more cameras which have captured the stereoscopic image; and
    decoding and restoring, based on the extracted camera parameter, the image data of the stereoscopic image,
    wherein the extracting the camera parameter comprises:
    extracting a principal point information setting parameter indicating whether information regarding each of principal points of a primary view image and a secondary view image of the stereoscopic image is set; and
    if the principal point information setting parameter indicates that the information regarding the principal points is set, extracting a primary principal point parameter representing the principal point of the primary view image of the stereoscopic image and a secondary principal point parameter representing the principal point of the secondary view image of the stereoscopic image, wherein the principal point of the primary view image is a crossing point of the primary view image and an optical axis, and if the principal point information setting parameter indicates that the information regarding the principal point is not set, the extracting the camera parameter further comprises determining that a center point of the stereoscopic image is different from a center point of an area photographed by one of the two or more cameras.

2. The stereoscopic image restoring method of claim 1, wherein the extracting the camera parameter further comprises extracting a primary focal length parameter representing a focal length of a primary view camera of the two or more cameras and a secondary focal length parameter representing a focal length of a secondary view camera of the two or more cameras.

3. The stereoscopic image restoring method of claim 1, wherein the extracting the camera parameter further comprises extracting a focal length difference parameter indicating whether a primary focal length of a primary view camera of the two or more cameras is different from a secondary focal length of a secondary view camera of the two or more cameras.

4. The stereoscopic image restoring method of claim 3, wherein the extracting the camera parameter further comprises extracting one of a primary focal length parameter representing the primary focal length and a secondary focal length parameter representing the secondary focal length, if the focal length difference parameter indicates that the primary focal length is identical to the secondary focal length.

5. The stereoscopic image restoring method of claim 3, wherein the extracting the camera parameter further comprises extracting a primary focal length parameter representing the primary focal length and a secondary focal length parameter representing the secondary focal length if the focal length difference parameter indicates that the primary focal length is different from the secondary focal length.

6. The stereoscopic image restoring method of claim 1, wherein the extracting the camera parameter further comprises extracting a horizontal focal length parameter representing a horizontal component of a focal length of a predetermined view camera of the two or more cameras and a vertical focal length parameter representing a vertical component of the focal length of the predetermined view camera.

7. The stereoscopic image restoring method of claim 1, wherein the extracting the camera parameter further comprises:

extracting a focal length aspect ratio parameter representing an aspect ratio between a horizontal component and a vertical component of a focal length of a predetermined view camera of the two or more cameras; and extracting one of a horizontal focal length parameter representing the horizontal component of the focal length and a vertical focal length parameter representing the vertical component of the focal length.

8. The stereoscopic image restoring method of claim 1, wherein the extracting the camera parameter further comprises extracting a focal length aspect ratio use parameter indicating whether information regarding a focal length of a predetermined view camera of the two or more cameras is set based on an aspect ratio between a horizontal component and a vertical component of the focal length.

9. The stereoscopic image restoring method of claim 8, wherein the extracting the camera parameter further comprises extracting a focal length aspect ratio parameter representing the aspect ratio between the horizontal component and the vertical component of the focal length if the focal length aspect ratio use parameter indicates that the aspect ratio between the horizontal component and the vertical component of the focal length is used.

10. The stereoscopic image restoring method of claim 8, wherein the extracting the camera parameter further comprises determining the aspect ratio between the horizontal component and the vertical component of the focal length to have a value '1' if the focal length aspect ratio use parameter indicates that the aspect ratio between the horizontal component and the vertical component of the focal length is not used.

11. The stereoscopic image restoring method of claim 1, wherein the extracting the camera parameter further comprises extracting each of the primary principal point parameter and the secondary principal point parameter for x and y components.

12. The stereoscopic image restoring method of claim 1, wherein the extracting the camera parameter further comprises extracting an x axis rotation angle parameter representing a rotation angle with respect to an x axis, a y axis rotation angle parameter representing a rotation angle with respect to a y axis, and a z axis rotation angle parameter representing a rotation angle with respect to a z axis, from among rotation angles of a predetermined view camera of the two or more cameras.

13. The stereoscopic image restoring method of claim 12, wherein the extracting the camera parameter further comprises extracting a rotation angle parameter in which the rotation angle with respect to the x axis, the rotation angle with respect to the y axis, and the rotation angle with respect to the z axis are represented as one of a 3×3 matrix and a nine-bit array.

14. The stereoscopic image restoring method of claim 1, wherein, if the data stream is an International Standards Organization (ISO)-based media file format, the ISO-based media file format comprises a moov box, an mdat box, and a first meta box, and wherein the parsing comprises:

extracting the camera parameter from at least one of a sub level box of the first meta box, a first sub level box of the moov box, a first sub level box of a trak box which is a second sub level box of the moov box, and a sub level box of a second meta box which is a second sub level box of the trak box; and extracting the image data of the stereoscopic image from the mdat box.

15. A stereoscopic image data stream generating method comprising:

encoding image data of a stereoscopic image;

determining a camera parameter based on individual characteristics of each of two or more cameras which have captured the stereoscopic image; and inserting the image data and the determined camera parameter into a data stream, wherein the determining of the camera parameter comprises:

determining a principal point information setting parameter indicating whether information, regarding each of principal points of a primary view image and a secondary view image of the stereoscopic image, is set; and determining a primary principal point parameter representing the principal point of the primary view image of the stereoscopic image and a secondary principal point parameter representing the principal point of the secondary view image of the stereoscopic image, wherein the principal point of the primary view image is a crossing point of the primary view image and an optical axis, and if the principal point information setting parameter indicates that the information regarding the principal point is not set, the extracting the camera parameter further comprises determining that a center point of the stereoscopic image is different from a center point of an area photographed by one of the two or more cameras.

16. The stereoscopic image data stream generating method of claim 15, wherein the determining the camera parameter further comprises:

determining a focal length difference parameter indicating whether a primary focal length of a primary view camera of the two or more cameras is different from a secondary focal length of a secondary view camera of the two or more cameras; and determining at least one of a primary focal length parameter representing the primary focal length and a secondary focal length parameter representing the secondary focal length, based on the focal length difference parameter.

17. The stereoscopic image data stream generating method of claim 15, wherein the determining the camera parameter further comprises:

determining a focal length aspect ratio parameter representing an aspect ratio between a horizontal component and a vertical component of a focal length of a predetermined view camera of the two or more cameras; and determining one of a horizontal focal length parameter representing the horizontal component of the focal length and a vertical focal length parameter representing the vertical component of the focal length.

18. The stereoscopic image data stream generating method of claim 17, wherein the determining the camera parameter further comprises determining a focal length aspect ratio use parameter indicating whether information regarding the focal length is set by based on an aspect ratio between the horizontal component and the vertical component of the focal length, and wherein the determining the focal length aspect ratio parameter comprises determining a focal length aspect ratio parameter representing the aspect ratio between the horizontal component and the vertical component of the focal length if the focal length aspect ratio use parameter indicates that the aspect ratio between the horizontal component and the vertical component of the focal length is used.

19. A non-transitory computer readable recording medium having recorded thereon a computer program for executing a stereoscopic image restoring method, the method comprising:

parsing a received data stream into image data of a stereoscopic image and information regarding the stereoscopic image;

extracting, based on the parsed information, a camera parameter depending on individual characteristics of each of two or more cameras which have captured the stereoscopic image; and decoding and restoring, based on the extracted camera parameter, the image data of the stereoscopic image, wherein the extracting the camera parameter comprises:

extracting a principal point information setting parameter indicating whether information regarding each of principal points of a primary view image and a secondary view image of the stereoscopic image is set; and if the principal point information setting parameter indicates that the information regarding the principal points is set, extracting a primary principal point parameter representing the principal point of the primary view image of the stereoscopic image and a secondary principal point parameter representing the principal point of the secondary view image of the stereoscopic image, wherein the principal point of the primary view image is a crossing point of the primary view image and an optical axis, and if the principal point information setting parameter indicates that the information regarding the principal point is not set, the extracting the camera parameter further comprises determining that a center point of the stereoscopic image is different from a center point of an area photographed by one of the two or more cameras.

20. A non-transitory computer readable recording medium having recorded thereon a computer program for executing a stereoscopic image data stream generating method, the method comprising:

encoding image data of a stereoscopic image;

determining a camera parameter based on individual characteristics of each of two or more cameras which have captured the stereoscopic image; and inserting the image data and the determined camera parameter into a data stream, wherein the determining of the camera parameter comprises:

determining a principal point information setting parameter indicating whether information, regarding each of principal points of a primary view image and a secondary view image of the stereoscopic image, is set; and determining a primary principal point parameter representing the principal point of the primary view image of the stereoscopic image and a secondary principal point parameter representing the principal point of the secondary view image of the stereoscopic image, wherein the principal point of the primary view image is a crossing point of the primary view image and an optical axis, and if the principal point information setting parameter indicates that the information regarding the principal point is not set, the extracting the camera parameter further comprises determining that a center point of the stereoscopic image is different from a center point of an area photographed by one of the two or more cameras.

* * * * *